(12) United States Patent
Lee et al.

(10) Patent No.: US 8,068,560 B2
(45) Date of Patent: Nov. 29, 2011

(54) QR DECOMPOSITION APPARATUS AND METHOD FOR MIMO SYSTEM

(75) Inventors: Yu-Ro Lee, Daejon (KR); Jung-Bo Son, Daejon (KR); Minho Cheong, Daejon (KR); Sok-Kyu Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 706 days.

(21) Appl. No.: 12/139,904

(22) Filed: Jun. 16, 2008

(65) Prior Publication Data

US 2009/0154579 A1    Jun. 18, 2009

(30) Foreign Application Priority Data

Dec. 15, 2007    (KR) .................. 10-2007-0131836

(51) Int. Cl.
*H04L 27/14*    (2006.01)
*H04L 1/02*    (2006.01)
(52) U.S. Cl. ...................... 375/316; 375/347
(58) Field of Classification Search .......... 375/260, 375/267, 316, 324, 340, 347, 261, 300, 320, 375/322, 323, 329; 370/57, 69.1, 120, 281, 370/295, 302, 330, 343, 436, 478, 480–481, 370/7; 329/304, 315, 317–318, 347–349; 708/607
See application file for complete search history.

(56) References Cited

U.S. PATENT DOCUMENTS 7,363,200 B2 *  4/2008  Lu ..................................... 703/2
7,489,746 B1 *  2/2009  Awater et al. ................ 375/341
(Continued)

FOREIGN PATENT DOCUMENTS

KR    10-2006-0012825    2/2006
(Continued)

OTHER PUBLICATIONS

Kimura et al., Multiple-QR-Decomposition Assisted Group Detection For Reduced-Complexity-And-Latency MIMO-OFDM Receivers, 2005, Personal, Indoor and Mobile Radio Communications, 2006 IEEE 17th International Symposium on, pp. 1-5.*

(Continued)

*Primary Examiner* — Tesfaldet Bocure
*Assistant Examiner* — Lawrence Williams
(74) *Attorney, Agent, or Firm* — Kile Park Goekjian Reed & McManus PLLC

(57) ABSTRACT

Provided is a QR decomposition apparatus and method that can reduce the number of computers by sharing hardware in an MIMO system employing OFDM technology to simplify a structure of hardware. The QR decomposition apparatus includes a norm multiplier for calculating a norm; a Q column multiplier for calculating a column value of a unitary Q matrix to thereby produce a Q matrix vector; a first storage for storing the Q matrix vector calculated in the Q column multiplier; an R row multiplier for calculating a value of an upper triangular R matrix by multiplying the Q matrix vector by a reception signal vector; and a Q update multiplier for receiving the reception signal vector and an output of the R row multiplier, calculating an Q update value through an accumulation operation, and providing the Q update value to the Q column multiplier to calculate a next Q matrix vector.

18 Claims, 9 Drawing Sheets

U.S. PATENT DOCUMENTS

| | | | | |
|---|---|---|---|---|
| 7,782,971 | B2* | 8/2010 | Burg et al. | 375/267 |
| 7,804,801 | B2* | 9/2010 | Lee et al. | 370/334 |
| 7,912,140 | B2* | 3/2011 | Anholt et al. | 375/262 |
| 7,936,838 | B2* | 5/2011 | Ito et al. | 375/267 |
| 2006/0224655 | A1* | 10/2006 | Shirai et al. | 708/607 |
| 2007/0067378 | A1* | 3/2007 | Barford | 708/446 |
| 2007/0155433 | A1* | 7/2007 | Ito et al. | 455/562.1 |
| 2007/0230628 | A1* | 10/2007 | You et al. | 375/340 |
| 2008/0225976 | A1* | 9/2008 | Prasad et al. | 375/267 |
| 2009/0101910 | A1* | 4/2009 | Zhang et al. | 257/66 |
| 2009/0154586 | A1* | 6/2009 | Lee et al. | 375/267 |
| 2010/0042666 | A1* | 2/2010 | Park et al. | 708/212 |
| 2010/0150274 | A1* | 6/2010 | Dai et al. | 375/340 |

FOREIGN PATENT DOCUMENTS

| | | | |
|---|---|---|---|
| KR | 10-2006-0047844 | A | 5/2006 |
| KR | 10-2007-0011304 | A | 1/2007 |
| KR | 10-2007-0118835 | A | 12/2007 |

OTHER PUBLICATIONS

Singh et al., A Fixed Point Implementation for QR Decomposition, 2006, Design, Application, Integration and Software, 2006 IEEE Dallas/CAS Workshop on, pp. 75-78.*

Bischof et al., On Updating Subspaces, 1992, Signal Processing, IEEE Transactions on, vol. 40, Issue 1, pp. 96-105.*

Kim et al., Efficient Successive Interference Cancellation Algorithms for the DSTTD System, 2005, Personal, Indoor and Mobile Radio Communications, 2005. PIMRC 2005, IEEE 16th International Symposium on, vol. 1, pp. 62-66.*

Kim et al., Transmit Antenna Selection for Hybrid Space-Time Block Code With Decision-Feedback Detector, 2007, Vehicular Technology Conference, 2007. VTC-2007 Fall. 2007 IEEE 66th, pp. 768-772.*

Dirk Wubben et al., "MMSE Extension of V-BLAST based on Sorted QR Decomposition", 2003 IEEE VTC, Oct. 2003, pp. 508-512, vol. 1.

* cited by examiner

FIG. 2
(PRIOR ART)

| LTF1 | LTF2 | LTF3 | LTF4 | LTF5 | LTF6 | LTF7 | LTF8 | SIG | DATA0 | DATA1 | DATA2 | DATA3 |

QR DECOMPOSITION APPARATUS AND METHOD FOR MIMO SYSTEM

CROSS-REFERENCE(S) TO RELATED APPLICATIONS

The present invention claims priority of Korean Patent Application No. 10-2007-0131836, filed on Dec. 15, 2007, which is incorporated herein by reference.

BACKGROUND OF THE INVENTION

1. Field of the Invention

The present invention relates to a QR decomposition apparatus and method in a Multiple Input Multiple Output (MIMO) system; and, more particularly, to a QR decomposition apparatus and method that can reduce the number of computers by sharing hardware in an MIMO system employing Orthogonal Frequency Division Multiplexing (OFDM) technology to thereby simplify a structure of hardware.

This work was partly supported by the IT R & D program of MIC/IITA [2006-S-002-02, "IMT-Advanced Radio Transmission Technology with Low Mobility"].

2. Description of Related Art

At present, there are increasing demands for wireless communication system capable of transmitting high-quality and large-volume multimedia data by using limited frequency resources. Among the methods for transmitting large-volume data by using limited frequency resources is a Multiple Input Multiple Output (MIMO) system. An MIMO system forms a plurality of independent fading channels by using multiple antennas at transmitting and receiving ends and transmits different signals for each transmission antenna to thereby improve a data transmission rate remarkably. Thus, the MIMO system can transmit a great deal of data without broadening frequency.

However, MIMO systems are weak to inter-symbol interference and frequency selective fading that are caused during high-speed data transmission. To overcome the shortcoming, the MIMO systems employ Orthogonal Frequency Division Multiplexing (OFDM) technology. OFDM is a modulation scheme most appropriate for high-speed data transmission at present. According to OFDM, one data sequence is transmitted over subcarrier which is transmitted at a lower data transmission rate than that of the data sequence.

Typically, a channel environment for wireless communication has multiple paths, which is called multipath, due to obstacles such as buildings. Delay spread occurs in wireless channel having multipath due to the multipath. When delay spread time is longer than symbol transmission interval, inter-symbol interference (ISI) occurs. In this case, frequency selective fading occurs in a frequency domain. When a single carrier is used, an equalizer is used to remove the inter-symbol interference components. However, as data rate increases, the equalizer becomes more complicated.

When an MIMO system is combined with an OFDM system, the advantages of the MIMO system can be taken while the disadvantage of the MIMO system is offset by the OFDM system. Typically, an MIMO system has N transmission antennas and M reception antennas. A structure combining the MIMO system with the OFDM technology is referred to as a MIMO-OFDM system.

FIGS. 1A and 1B are block views showing structures of an MIMO-OFDM system. FIG. 1A is a block view illustrating a transmitting end of the MIMO-OFDM system, and FIG. 1B is a block view illustrating a receiving end of the MIMO-OFDM system.

Referring to FIG. 1A, a serial-to-parallel (S/P) converter 101 divides transmission data into a plurality of parallel data sequences. A plurality of encoders 102 encode a parallel data sequence, respectively. Each encoded data sequence is modulated in a Quadrature Amplitude Modulation (QAM) mapper 103 based on a modulation scheme, such as Binary Phase Shift Keying (BPSK), Quadrature Phase Shift Keying (QPSK), 16QAM, and 64QAM, respectively, to thereby produce modulated symbols. The modulated symbols are converted into signals of a time axis in an Inverse Fast Fourier Transformer (IFFT) 104. A cyclic prefix (CP) inserter 105 inserts a cyclic prefix code for guard interval to the time-axis symbols. Subsequently, a digital-to-analog conversion (DAC) and radio frequency (RF) unit 106 converts the digital signals with the CP code inserted thereto into analog signals, converts the analog signals into RF signals, and sends out the RF signals through an antenna.

Referring to FIG. 1B, a digital-to-analog conversion (ADC) and RF unit 107 converts the RF signals into analog signals and converts the analog signals into digital signals. A CP remover 108 removes the CP code inserted for guard interval and transmits signals without a CP code to a Fast Fourier Transformer (FFT) 109. The FFT 109 executes high-speed Fourier conversion onto the inputted parallel signals to thereby generate transmission data symbols. An MIMO receiver 110 estimates the generated transmission data symbols and calculates a log likelihood ratio (LLR) of the estimated symbols. Decoders decode the data sequences transmitted from the MIMO receiver 110, respectively, and estimates transmission data. A parallel-to-serial (P/S) converter 112 converts the decoded parallel data outputted from the decoders 111.

Examples of the MIMO receiver 110 include a Decision Feedback Equalizer (DFE), a zero forcing (ZF) device, a Minimum Mean Square Error Estimator (MMSE), and a Bell Labs Layered Space-Time (BLAST) device. As the MIMO receiver includes more transmission and reception antennas, the complexity of the MIMO receiver becomes high and, particularly, the complexity of QR decomposition increases greatly.

When it is assumed that there are M antennas and the number of reception antennas is N, a reception vector z of arbitrary subcarrier after FFT can be expressed as the following Equation 1.

$$z = Hs + n \qquad \text{Eq. 1}$$

where $$z = \begin{bmatrix} z_1 \\ z_2 \\ \vdots \\ z_N \end{bmatrix};$$

channel ($H$) is $$H = \begin{bmatrix} h_{1,1} & h_{1,2} & \cdots & h_{1,M} \\ h_{2,1} & h_{2,2} & \cdots & h_{2,M} \\ \vdots & \vdots & \ddots & \vdots \\ h_{N,1} & h_{N,2} & \cdots & h_{N,M} \end{bmatrix};$$

and a transmission symbol ($s$) is $$s = \begin{bmatrix} s_1 \\ s_2 \\ \vdots \\ s_M \end{bmatrix}.$$

The channel (H) may be expressed as H=QR after QR decomposition. Generally, the number N of reception antennas is equal to or greater than the number M of transmission antennas in an MIMO system, an upper triangular R matrix is expressed as Equation 2.

$$R = Q^H H = \begin{bmatrix} r_{1,1} & r_{1,2} & \cdots & r_{1,M} \\ 0 & r_{2,2} & \cdots & r_{2,M} \\ \vdots & \vdots & \ddots & \vdots \\ 0 & 0 & \cdots & r_{M,M} \\ 0 & 0 & \cdots & 0 \\ \vdots & \vdots & \ddots & \vdots \\ 0 & 0 & \cdots & 0_{N,M} \end{bmatrix} \quad \text{Eq. 2}$$

where $Q$ denotes a unitary matrix $(Q^H Q = I)$

The channel matrix (H) is N×M; Q=N×N; and the upper triangular R matrix is N×M. Herein, the Q can be expressed as:

$$Q = \begin{bmatrix} q_{1,1} & q_{1,2} & q_{1,3} & q_{1,4} & \cdots & q_{1,N} \\ q_{2,1} & q_{2,2} & q_{2,3} & q_{2,4} & \cdots & q_{2,N} \\ q_{3,1} & q_{3,2} & q_{3,3} & q_{3,4} & \cdots & q_{3,N} \\ q_{4,1} & q_{4,2} & q_{4,3} & q_{4,4} & \cdots & q_{4,N} \\ \vdots & \vdots & \vdots & \vdots & \ddots & \vdots \\ q_{N,1} & q_{N,2} & q_{N,3} & q_{N,4} & \cdots & q_{N,N} \end{bmatrix}.$$

Accordingly, the modified reception vector y is expressed as the following Equation 3.

$$y = \begin{bmatrix} y_1 \\ y_2 \\ \vdots \\ y_N \end{bmatrix} = Q^H z = Rs + n' \quad \text{Eq. 3}$$

$$= \begin{bmatrix} r_{1,1} & r_{1,2} & \cdots & r_{1,M} \\ 0 & r_{22} & \cdots & r_{2,M} \\ 0 & \vdots & \ddots & \vdots \\ 0 & \cdots & 0 & r_{N,M} \end{bmatrix} \begin{bmatrix} s_1 \\ s_2 \\ \vdots \\ s_M \end{bmatrix} + \begin{bmatrix} n'_1 \\ n'_2 \\ \vdots \\ n'_N \end{bmatrix}.$$

The Equation 3 can be simply expressed as follows.

$$y = \begin{bmatrix} y_1 \\ y_2 \\ \vdots \\ y_M \end{bmatrix} = Q^H z = Rs + n'$$

$$= \begin{bmatrix} r_{1,1} & r_{1,2} & \cdots & r_{1,M} \\ 0 & r_{22} & \cdots & r_{2,M} \\ 0 & \vdots & \ddots & \vdots \\ 0 & \cdots & 0 & r_{M,M} \end{bmatrix} \begin{bmatrix} s_1 \\ s_2 \\ \vdots \\ s_M \end{bmatrix} + \begin{bmatrix} n'_1 \\ n'_2 \\ \vdots \\ n'_M \end{bmatrix}.$$

Gram-Schmidt method is known as a simple method among other methods for QR decomposition. The following Equation 4 describes a typical QR decomposition method. Referring to the Equation 4, a norm, which is a vector size, is calculated first (norm1=$\|q_i\|^2$), and a Q column value for a reception vector is calculated ($q_i := q_i/r_{i,j}$) by obtaining $r_{i,j}$ for $\sqrt{\text{norm}_i}$. Subsequently, an R column value is calculated based on the obtained Q column value and the reception vector, and a Q update value and a norm update value are calculated. This process is repeated until $n_T$ is decided by the transmission and reception antennas.

$$\begin{array}{l} R = 0, Q = H \\ \text{for } i = 1, \ldots, n_T \\ \quad \text{norm}_i = \| q_i \|^2 \\ \text{end} \\ \text{for } i = 1, \ldots, n_T \\ \quad r_{i,i} = \sqrt{\text{norm}_i} \\ \quad q_i := q_i / r_{i,i} \\ \quad \text{for } k = i+1, \ldots, n_T \\ \quad\quad r_{i,k} = q_i^H \cdot q_k \\ \quad\quad q_k := q_k - r_{i,k} \cdot q_i \\ \quad\quad \text{norm}_k := \text{norm}_k - r_{i,k}^2 \\ \quad \text{end} \\ \text{end} \end{array} \quad \text{Eq. 4}$$

To take an example where $n_T=8$ in the Equation 4, more than 2000 multipliers and 8 dividers are required. Also, it takes 256 multipliers for $Q^H z$ real part computation. In total, the number of entire multipliers comes to more than 2200, which are too many to be realized as hardware.

SUMMARY OF THE INVENTION

An embodiment of the present invention is directed to providing a QR decomposition apparatus and method that can simplify a hardware structure by reducing the number of multipliers through hardware sharing in a Multiple Input Multiple Output (MIMO) system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a QR decomposition apparatus used for a receiver in an MIMO system, including: a norm multiplier for calculating a norm; a Q column multiplier for calculating a column value of a unitary Q matrix to thereby produce a Q matrix vector; a first storage for storing the Q matrix vector calculated in the Q column multiplier; an R row multiplier for calculating a value of an upper triangular R matrix by multiplying the Q matrix vector by a reception signal vector; and a Q update multiplier for receiving the reception signal vector and an output of the R row multiplier, calculating an Q update value through an accumulation operation, and providing the Q update value to the Q column multiplier to calculate a next Q matrix vector.

The QR decomposition apparatus further includes a second storage for receiving an output of the norm multiplier and outputting a √norm value based on a lookup table; and a third storage for receiving an output of the norm multiplier and outputting a 1/√norm value based on a lookup table.

In accordance with another aspect of the present invention, there is provided a QR decomposition method in an MIMO system, including: calculating an upper triangular R matrix vector by multiplying a Q matrix vector by a reception signal vector; updating the Q matrix vector through an accumulation operation based on the reception signal vector and the R matrix vector obtained in said calculating an upper triangular R matrix vector; updating a norm based on the Q matrix vector updated in said updating the Q matrix vector; and calculating a Q matrix vector based on a value obtained by the norm updated in said updating a norm and the updated Q matrix vector.

BRIEF DESCRIPTION OF THE DRAWINGS

FIG. 2 illustrates a typical transmission frame.

DESCRIPTION OF SPECIFIC EMBODIMENTS

The advantages, features and aspects of the invention will become apparent from the following description of the embodiments with reference to the accompanying drawings, which is set forth hereinafter. Also, when it is considered that detailed description on a related art to which the present invention pertains may obscure a point of the present invention, the description will not be provided herein. Hereinafter, specific embodiments of the present invention will be described in detail by referring to the accompanying drawings.

FIG. 2 shows a typical structure of a transmission frame. A typical transmission frame includes an 8-symbol long training field (LTF), a signal field (SIG) including frame information, and a plurality of data symbols. For the sake of easy explanation of the present invention, an example where M=8; N=8; and one OFDM symbol=288 samples will be described herein.

Figure 1A:
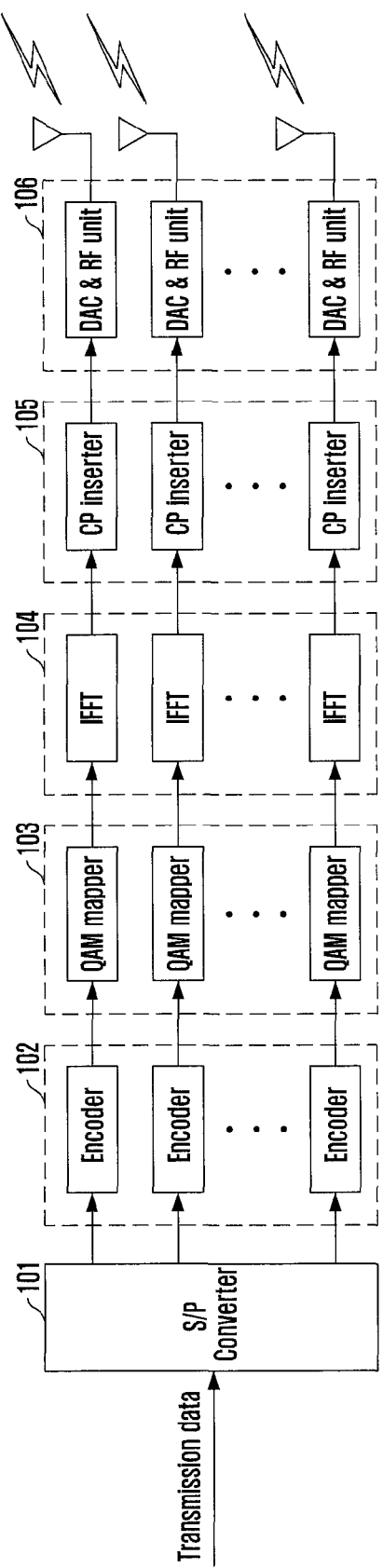
FIGS. 1A and 1B are block views showing a transmitting end and a receiving end of a typical Multiple Input Multiple Output (MIMO) system based on Orthogonal Frequency Division Multiplexing (OFDM).
Figure 1B:
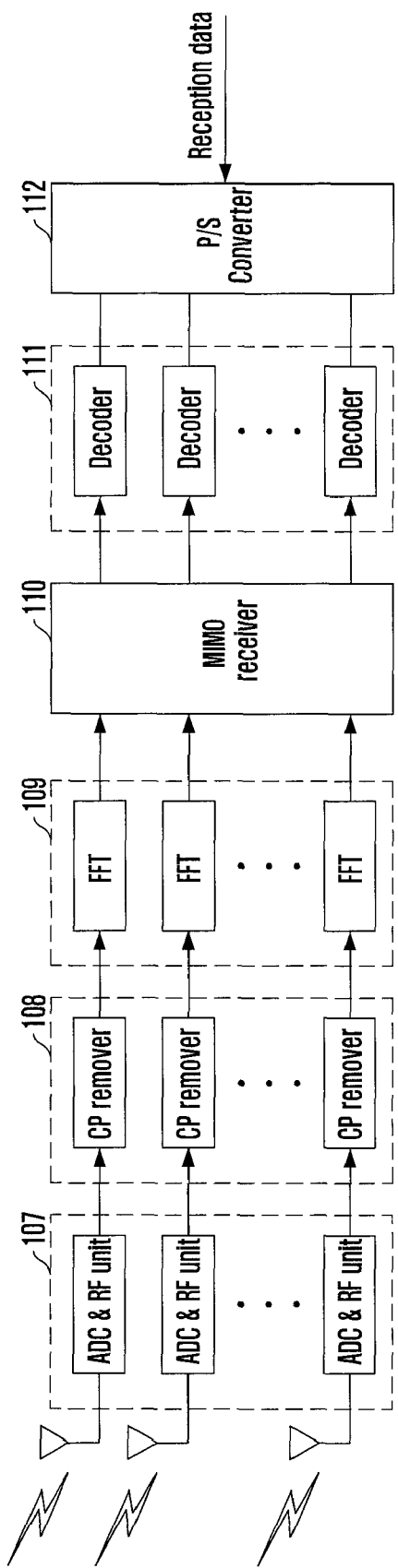
Figure 3:
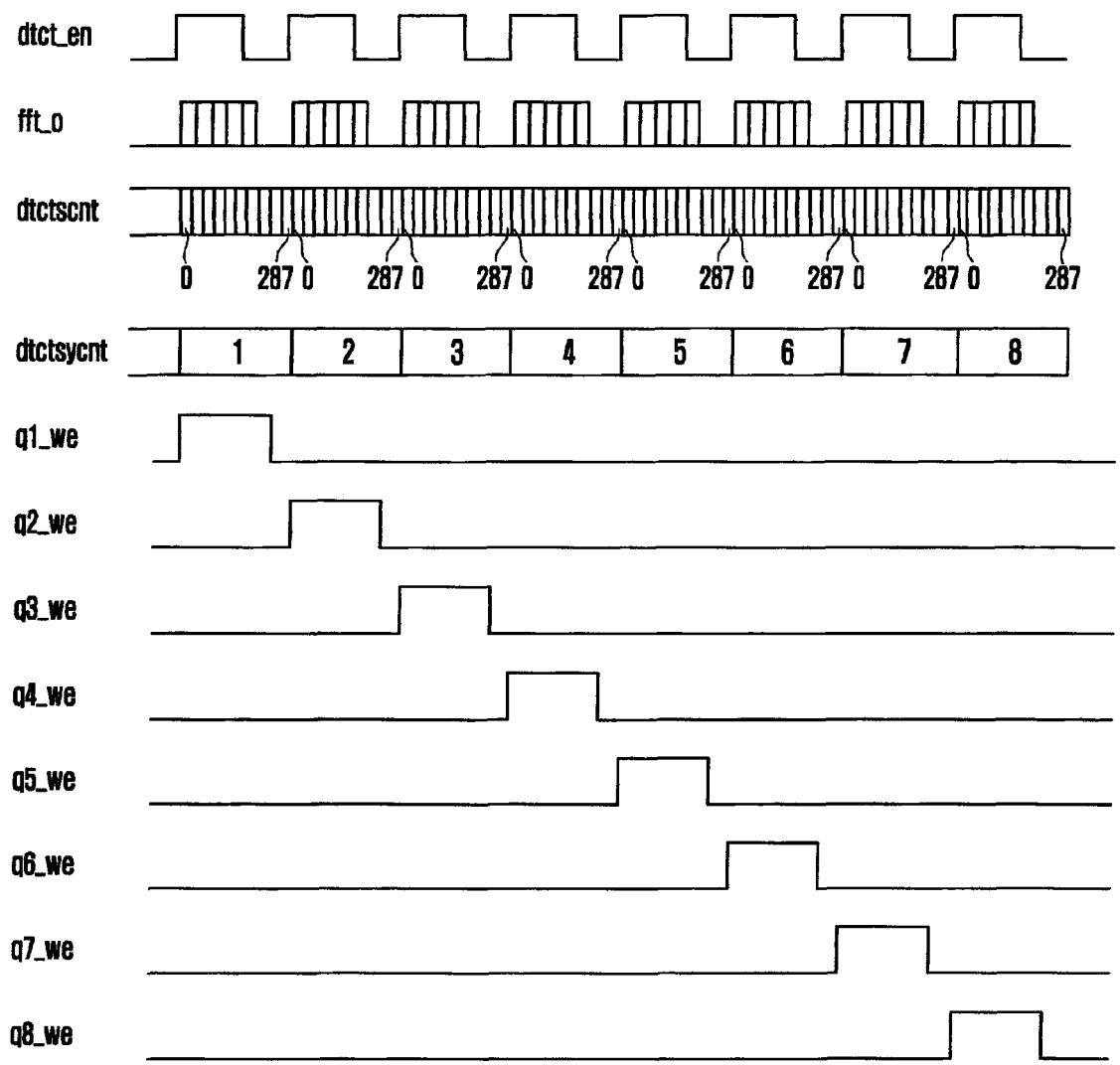
FIG. 3 shows operation timing diagrams of a Q memory and R memory in accordance with an embodiment of the present invention.

FIG. 3 shows operation timing diagrams of a memory of Q and R matrix during QR decomposition in accordance with an embodiment of the present invention.

dtct_en is an enable signal for detecting a reception signal and it is an enable signal of a reception signal z vector. dtctscnt is a sample count and there are 288 samples for one symbol. dtctsycnt is a symbol count. q1_we is an enable signal for storing a first column vector into a memory in a Q matrix. q2_we is an enable signal for storing a second column vector into the memory in the Q matrix. Q3_we through Q8_we are enable signals for storing third to eighth column vectors into the memory.

Figure 4:
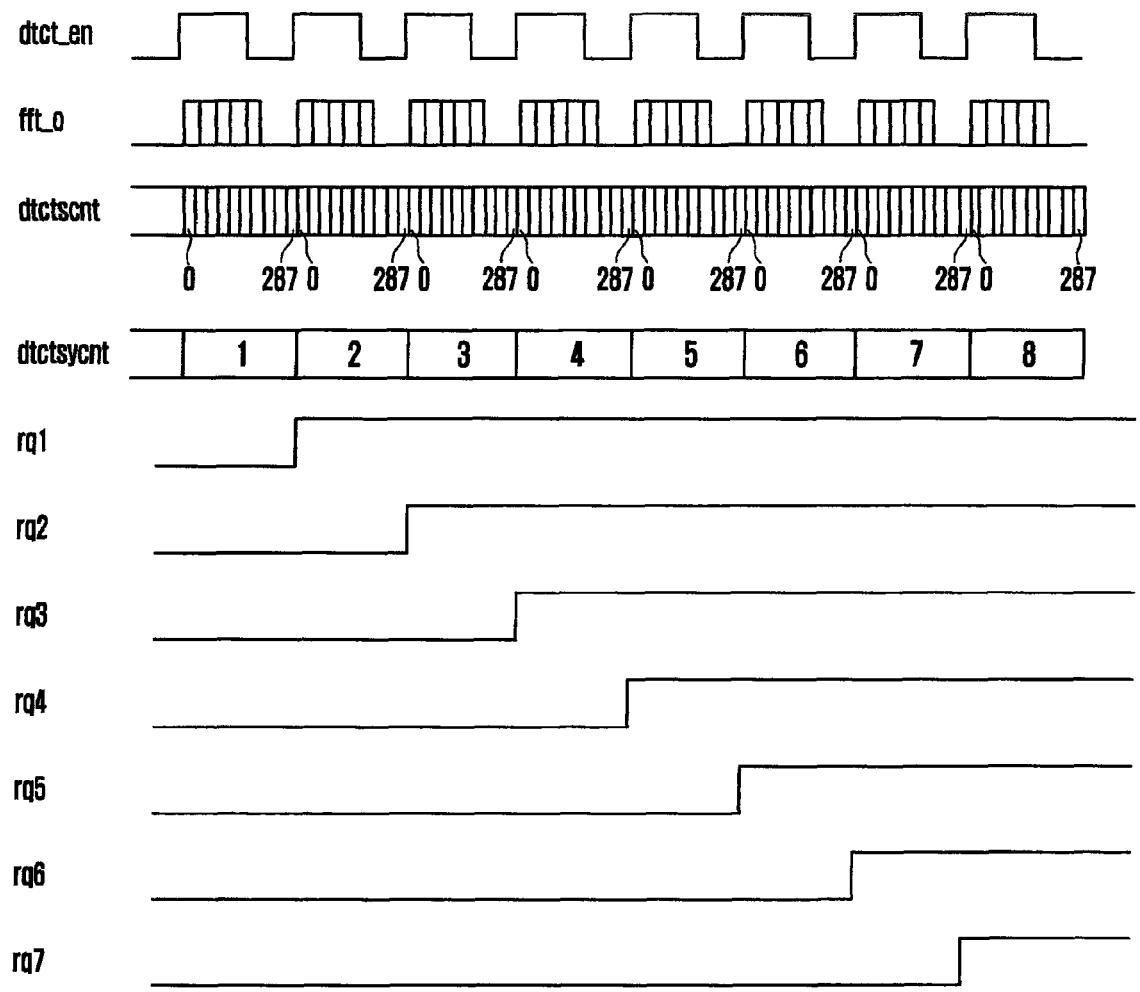
FIG. 4 shows operation timing diagrams for calculating a Q update value in accordance with an embodiment of the present invention.

FIG. 4 shows an enable signal for calculating $r_{k,i} q_k$ in the QR decomposition. At dtctsycnt=8, enable signals of rq1 to rq7 are 1 to calculate a Q update value of Equation 5.

$$q_8 := z_8 + \sum_{k=1}^{7} (-r_{k,8} \cdot q_k) \qquad \text{Eq. 5}$$

Figure 5:
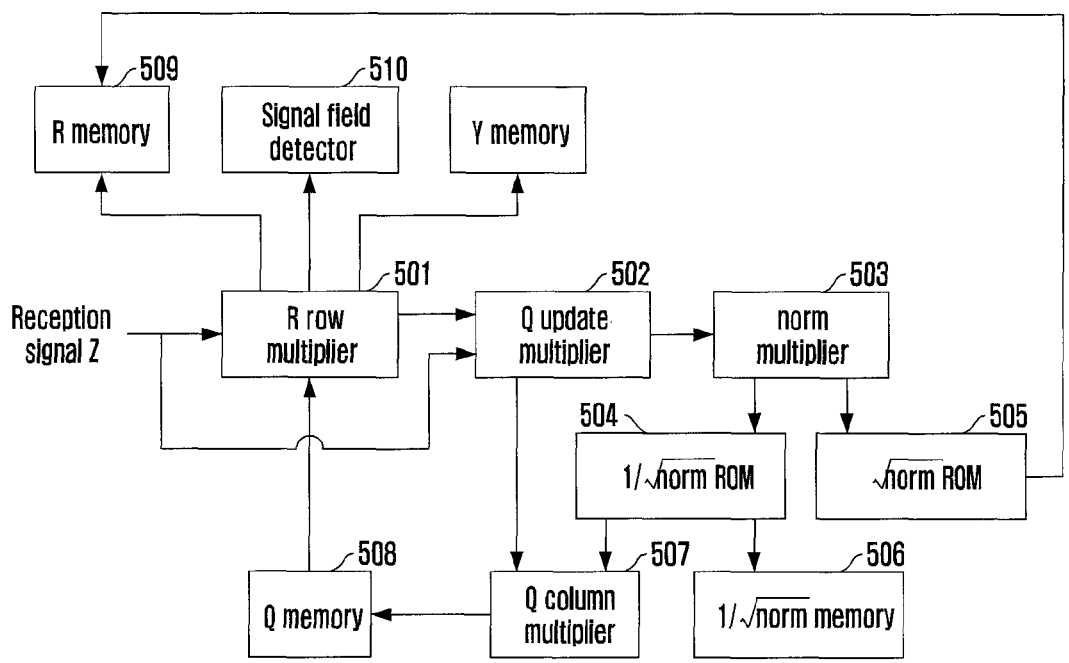
FIG. 5 is a block view describing a QR decomposition apparatus in accordance with an embodiment of the present invention.

FIG. 5 is a block view describing a QR decomposition apparatus in accordance with an embodiment of the present invention. The operation of the QR decomposition apparatus suggested in the present invention may be represented as the following Equation 6.

$$\begin{aligned}
&\text{for } i = 1,\ldots,n_T \\
&\quad \text{for } k = 1,\ldots,i-1 \\
&\quad\quad r_{k,i} = q_k^H \cdot z_i \\
&\quad q_i := z_i + \sum_{k=1}^{i-1} (-r_{k,i} \cdot q_k) \\
&\quad \text{norm}_i = \|q_i\|^2 \\
&\quad r_{i,j} = \sqrt{\text{norm}_i} \\
&\quad q_i = q_i / r_{i,j} \\
&\quad \text{end} \\
&\text{end}
\end{aligned} \qquad \text{Eq. 6}$$

Hereinafter, a QR decomposition apparatus of the present invention will be described in detail by referring to the accompanying FIGS. 5 to 7.

Generally, a QR decomposition apparatus includes a norm multiplier 503, a Q column multiplier 507, a Q memory 508, an R row multiplier 501, an R memory 509, and a Q update multiplier 502. The norm multiplier 503 calculates a norm, which is a vector size. The Q column multiplier 507 calculates values of a Q column. The Q memory 508 stores a Q matrix vector calculated in the Q column multiplier 507. The R row multiplier 501 calculates the values of an R row. The R memory 509 stores an R matrix vector calculated in the R row multiplier 501. The Q update multiplier 502 calculates a Q update value.

To have a close look at the constituent elements, the R row multiplier 501 calculates the values of an R row by calculating an operation of $r_{i,j} = q_k^H \cdot z_i$ based on the Q column vector which is calculated in the Q column multiplier 507 and stored in the Q memory 508 and an inputted reception signal z vector. Since the row values ($r_{i,j}$) of the R row calculated in the R row multiplier 501 are row values of the R matrix in the QR decomposition, they are stored in the R memory 509. Also, the R row multiplier 501 provides a value for signal field detection to a signal field detector 510.

The Q update multiplier 502 updates a Q value by subtracting a value obtained by summing the R matrix vector calculated in the R row multiplier 501 with a previous Q update value from the reception signal vector z. The updated Q value is delivered to the Q column multiplier 507 to be used for calculation of a Q column value in the next cycle. The operation of the Q update multiplier 502 is represented in Equation 5.

The norm multiplier 503 for calculating a norm, which is a vector size, calculates a norm for $q_i$ through an operation of $\text{norm}_i = \|q_i\|^2$ for a channel input after initial FFT. Also, the norm multiplier 503 calculates a norm to be used in the next cycle by using the updated Q value obtained in the Q update multiplier 502.

The output of the norm multiplier 503 is inputted to lookup table ROMs 504 and 505, which are a $1/\sqrt{\text{norm}}$ ROM 504 and a $\sqrt{\text{norm}}$ ROM 505, individually. Each of the lookup table ROMs 504 and 505 output $\sqrt{\text{norm}}$ and $1/\sqrt{\text{norm}}$ corresponding to the norm inputted through an operation of $r_{i,j} = \sqrt{\text{norm}_i}$. The value $1/\sqrt{\text{norm}}$ outputted from the lookup table ROM 504 is stored in a $1/\sqrt{\text{norm}}$ memory 506.

The Q column multiplier 507 receives the value outputted from the lookup table ROM 504 and the vector obtained from the calculation of the Q update multiplier 502, and calculates column values of the Q column through an operation of $q_i = q_i/r_{i,j}$. Since the Q column values obtained from the calculation of the Q column multiplier 507 are the result values of a QR matrix used in the signal decoding of reception antennas, they are stored in the Q memory 508.

Figure 6:
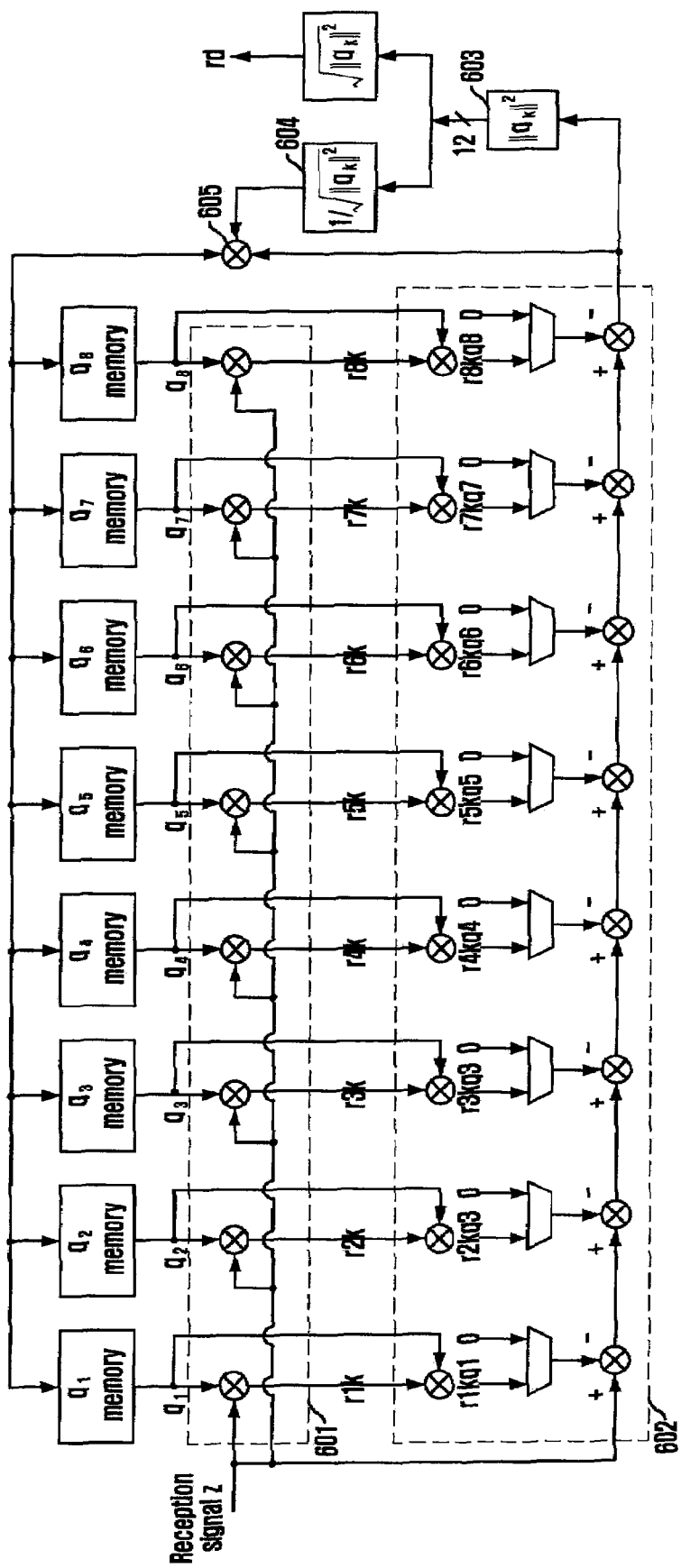
FIGS. 6 and 7 conceptually illustrate operation of a QR decomposition apparatus in accordance with an embodiment of the present invention.
Figure 7:
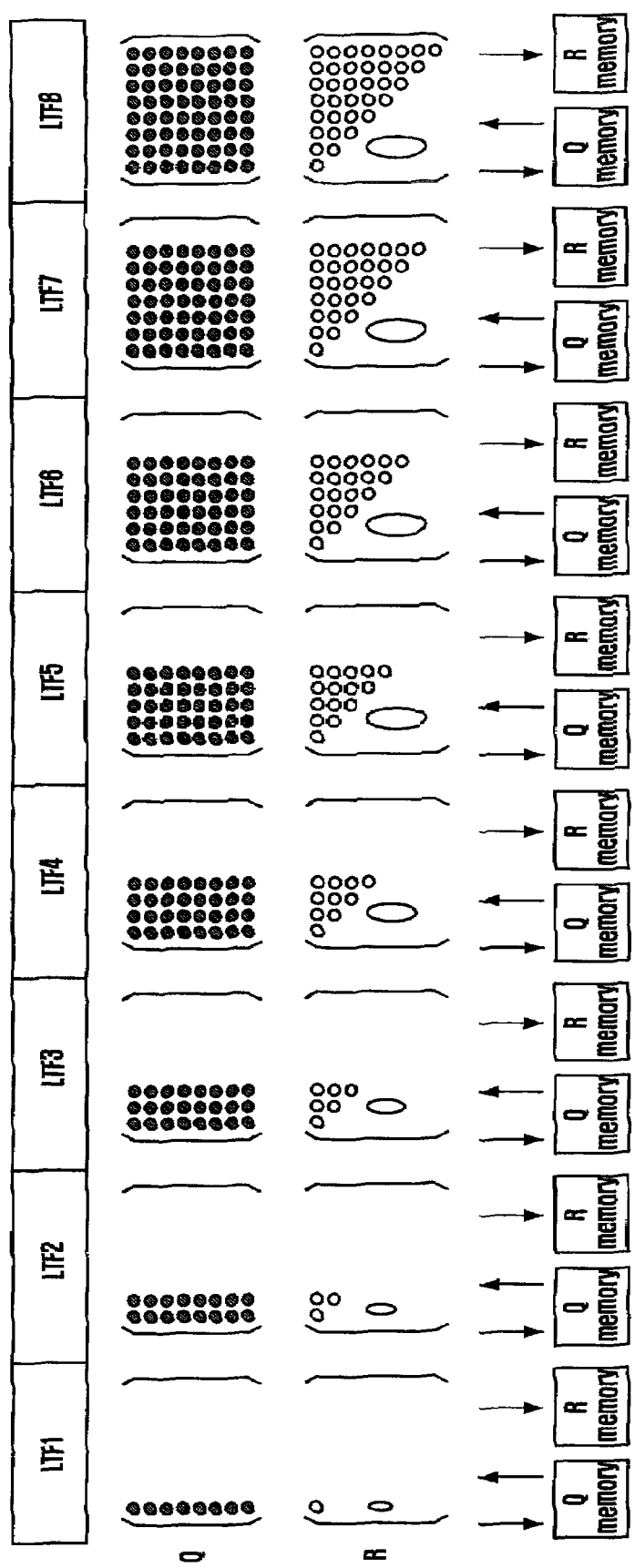

FIG. 6 conceptually illustrates operation of a QR decomposition apparatus in accordance with an embodiment of the present invention, and FIG. 7 illustrates a Q matrix and an R matrix calculated in a duration of 8 long training fields.

In the drawing, the QR decomposition apparatus includes R row multipliers 601, Q update multipliers 602, a norm update multiplier 603, lookup table ROMs 604, and a Q column multiplier 605.

Referring to FIGS. 6 and 7, the R row multipliers 601 obtains elements of an R matrix vector by multiplying a reception vector z, which is a long training field, by each column value of a Q memory and stores the elements of the R matrix vector in an R memory.

The Q update multiplier 602 updates a Q value by subtracting a value obtained by summing a previous Q update value, which is stored in the Q memory, with the R matrix vector obtained in the R row multipliers 601 from the reception signal vector z.

The norm multiplier 603 calculates a norm based on the Q update value obtained in the Q update multipliers 602. The Q column multiplier 605 normalize enable signals of rq1 to rq7 and a value obtained based on the enable signals of rq1 to rq7 by $1/\sqrt{\|qk\|^2}$ to thereby calculate a Q matrix. The elements of the Q matrix calculated in the Q column multiplier 605 are stored in the Q memory in response to enable signals of q1_we to q8_we. As shown in FIG. 2, $Q^H z$ from DATA0 where data signals of y1 to y8 are received can be obtained based on a vector without additional hardware. Also, an MRC result value for detecting a signal field can be obtained by multiplying a q8 memory by a reception signal z. When a signal field is received in the same method as a long training field LTF1 is received, the MRC can be obtained by multiplying a q1 memory by the reception signal z.

As illustrated in FIG. 7, first elements of Q and R are obtained in an LTF1 duration and stored in the Q and R memories. In LTF2 to LTF8 durations, second to eighth elements of Q and R are obtained and stored in the Q and R memories, respectively.

The process of obtaining the Q matrix and the R matrix may be divided on a cyclic basis as follows.

First, in a first cycle, a $\text{norm}_1$ is calculated by using $q_1$, which is described as Equation 7, and the first column elements of the Q matrix are calculated based on a $\sqrt{\text{nomr}_1}$ value.

$$\text{norm}_1 = \|q_1\|^2$$

$$r_{1,1} = \sqrt{\text{norm}_1}$$

$$q_1 = q_1/r_{1,1} \qquad \text{Eq. 7}$$

In the second cycle, the first elements of the R matrix are calculated by multiplying the Q matrix vector obtained based on Equation 8 by the reception vector z. Then, a Q value and a norm are updated, and second column elements of the Q matrix are calculated by using the updated Q value and the updated norm.

$$r_{1,3} = q_1^H \cdot z_3 \qquad \text{Eq. 8}$$

$$r_{2,3} = q_2^H \cdot z_3$$

$$q_3 := z_3 + \sum_{k=1}^{2}(-r_{k,3} \cdot q_k)$$

$$\text{norm}_3 = \|q_3\|^2$$

$$r_{3,3} = \sqrt{\text{norm}_3}$$

$$q_3 = q_3/r_{3,3}$$

Subsequently, in the third cycle, the next elements of the R matrix are calculated by multiplying the Q matrix vectors obtained based on Equation 9 by the reception vector z. Then, the Q value and the norm are updated, and the next column elements of the Q matrix are calculated by using the updated Q value and the updated norm.

$$r_{1,3} = q_1^H \cdot z_3 \qquad \text{Eq. 9}$$

$$r_{2,3} = q_2^H \cdot z_3$$

$$q_3 := z_3 + \sum_{k=1}^{2}(-r_{k,3} \cdot q_k)$$

$$\text{norm}_3 = \|q_3\|^2$$

$$r_{3,3} = \sqrt{\text{norm}_3}$$

$$q_3 = q_3/r_{3,3}$$

In the fourth cycle, the elements of the R matrix are calculated by multiplying the Q matrix vectors obtained based on Equation 10 by the reception vector z. Then, the Q value and the norm are updated, and the next column elements of the Q matrix are calculated by using the updated Q value and the updated norm.

$$r_{1,8} = q_1^H \cdot z_8 \qquad \text{Eq. 10}$$

$$r_{2,8} = q_2^H \cdot z_8$$

$$r_{3,8} = q_3^H \cdot z_8$$

$$r_{4,8} = q_4^H \cdot z_8$$

$$r_{5,8} = q_5^H \cdot z_8$$

$$r_{6,8} = q_6^H \cdot z_8$$

-continued
$$r_{7,8} = q_7^H \cdot z_8$$

$$q_8 := z_8 + \sum_{k=1}^{7}(-r_{k,8} \cdot q_k)$$

$$norm_8 = \|q_8\|^2$$

$$r_{8,8} = \sqrt{norm_8}$$

$$q_8 = q_8 / r_{8,8}$$

The same process as described in the above is executed up to the seventh cycle. In the eighth cycle, the elements of the R matrix and the Q matrix are calculated as Equation 11.

$$r_{1,8} = q_1^H \cdot z_8 \quad \text{Eq. 11}$$

$$r_{2,8} = q_2^H \cdot z_8$$

$$r_{3,8} = q_3^H \cdot z_8$$

$$r_{4,8} = q_4^H \cdot z_8$$

$$r_{5,8} = q_5^H \cdot z_8$$

$$r_{6,8} = q_6^H \cdot z_8$$

$$r_{7,8} = q_7^H \cdot z_8$$

$$q_8 := z_8 + \sum_{k=1}^{7}(-r_{k,8} \cdot q_k)$$

$$norm_8 = \|q_8\|^2$$

$$r_{8,8} = \sqrt{norm_8}$$

$$q_8 = q_8 / r_{8,8}$$

Meanwhile, the MRC value for detecting a signal field is calculated as the following Equation 12.

$$MRC = q_1^H Z_9 \quad \text{Eq. 12}$$

In the meantime, data signals of y1 to y8 can be calculated as Equation 13 based on a vector without additional hardware. Herein, j is dtctsycnt and j is equal to or greater than 10.

$$Q^H z$$

$$y_1 = q_1^H \cdot z_j$$

$$y_2 = q_2^H \cdot z_j$$

$$y_3 = q_3^H \cdot z_j$$

$$y_4 = q_4^H \cdot z_j$$

$$y_5 = q_5^H \cdot z_j$$

$$y_6 = q_6^H \cdot z_j$$

$$y_7 = q_7^H \cdot z_j$$

$$y_8 = q_8^H \cdot z_j \quad \text{Eq. 13}$$

In the description referring to FIG. 6, the Q matrix is an 8×8 matrix, which is [q1 q2 q3 q4 q5 q6 q7 q8], and the R matrix can be represented as follows.

$$\begin{bmatrix} rd & r11 & r12 & r13 & r14 & r15 & r16 & r17 \\ 0 & rd & r22 & r23 & r24 & r25 & r26 & r27 \\ 0 & 0 & rd & r33 & r34 & r35 & r36 & r37 \\ 0 & 0 & 0 & rd & r44 & r45 & r46 & r47 \\ 0 & 0 & 0 & 0 & rd & r55 & r56 & r57 \\ 0 & 0 & 0 & 0 & 0 & rd & r66 & r67 \\ 0 & 0 & 0 & 0 & 0 & 0 & rd & r77 \\ 0 & 0 & 0 & 0 & 0 & 0 & 0 & rd \end{bmatrix}$$

The $Q^H z$ output of the R row multiplier 601 is [r1k r2k r3k r4k r5k r6k r7k r8k]$^T$ and the output of signal field detection is r1k. For convenience in describing cycles, the elements of the R matrix are expressed as follows.

$$\begin{bmatrix} r_{11} & r_{12} & r_{13} & r_{14} & r_{15} & r_{16} & r_{17} & r_{18} \\ 0 & r_{22} & r_{23} & r_{24} & r_{25} & r_{26} & r_{27} & r_{28} \\ 0 & 0 & r_{33} & r_{34} & r_{35} & r_{36} & r_{37} & r_{38} \\ 0 & 0 & 0 & r_{44} & r_{45} & r_{46} & r_{47} & r_{48} \\ 0 & 0 & 0 & 0 & r_{55} & r_{56} & r_{57} & r_{58} \\ 0 & 0 & 0 & 0 & 0 & r_{66} & r_{67} & r_{68} \\ 0 & 0 & 0 & 0 & 0 & 0 & r_{77} & r_{78} \\ 0 & 0 & 0 & 0 & 0 & 0 & 0 & r_{88} \end{bmatrix}$$

Meanwhile, when a $1/\|q_i\|^2$ value is calculated using a lookup table ROM and the number of bits constituting $\|q_i\|$ is great, a ROM having a very wide width is required. For example, when $\|q_i\|$ includes 20 bits, the ROM table requires an address of $2^{20}$=1,048,576 bits. When depth also includes the same 20 bits, a very large ROM having 20,971,520 bits is required. To solve this problem, the present invention uses a floating point operation method to reduce the size of a ROM table.

Figure 8:
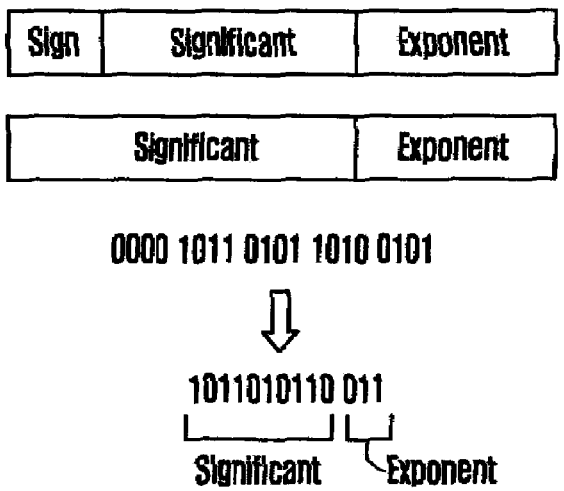
FIG. 8 describes a floating point operation method.

FIG. 8 describes a floating point operation method. When it is assumed that there is a 20-bit unsigned signal, it can be expressed by 13 bits, including a 10-bit significant value and a 3-bit exponent.

Figure 9:
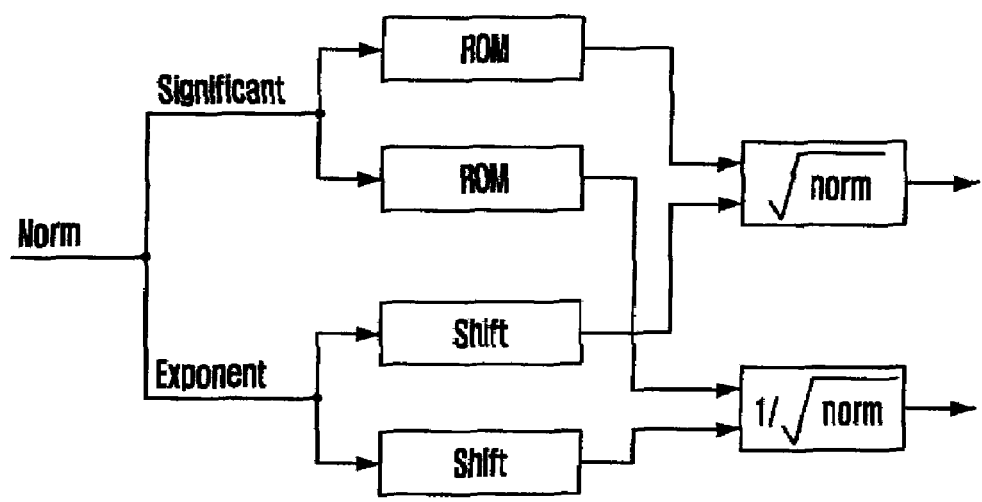
FIG. 9 describes an operation of a ROM table based on the floating point operation method in accordance with an embodiment of the present invention.

FIG. 9 describes an operation of a ROM table based on the floating point operation method in accordance with an embodiment of the present invention.

The output of the ROM table can be obtained using the significant bits as the address in the ROM table, and the output of the exponent can be obtained through a simple bit shift. To take an example of floating point 13 bits, the width of the ROM table is 10 bits and the depth is 10 bits. Thus, the size of the ROM table comes to 10,240. Accordingly, the size and address of the ROM table can be reduced remarkably. To reduce the size and address of the ROM table, the QR decomposition apparatus of the present invention includes a floating point converter for inputting the norm transmitted from the norm multiplier or a norm update multiplier converted in the form of floating points to the ROM table by using the significant value as the address, and inputting the exponent through shift.

Although the embodiment of the present invention described above presents the QR decomposition apparatus including 8 antennas and 8 long training fields, it is obvious to those skilled in the art to which the present invention pertains that the present invention can be easily applied to cases employing different numbers of antenna and long training fields.

The method of the present invention described above may be programmed for a computer. Codes and code segments constituting the computer program may be easily inferred by a computer programmer of ordinary skill in the art to which the present invention pertains. The computer program may be stored in a computer-readable recording medium, i.e., data storage, and it may be read and executed by a computer to realize the method of the present invention. The recording medium includes all types of computer-readable recording media.

The technology of the present invention described above can simplify a hardware structure by sharing multipliers to thereby reduce the number of multipliers during QR decomposition in an MIMO receiver.

While the present invention has been described with respect to the specific embodiments, it will be apparent to those skilled in the art that various changes and modifications may be made without departing from the spirit and scope of the invention as defined in the following claims.

What is claimed is:

1. A QR decomposition apparatus used for a receiver in a Multiple Input Multiple Output (MIMO) system, comprising:
    a norm multiplier for calculating a norm and outputting the norm of a received MIMO signal;
    a Q column multiplier for calculating a column value of a unitary matrix Q to thereby produce a Q matrix vector;
    a first storage for storing the Q matrix vector calculated in the Q column multiplier;
    an R row multiplier for calculating a value of an upper triangular R matrix by multiplying the Q matrix vector by a reception signal vector; and
    a Q update multiplier for receiving the reception signal vector and an output of the R row multiplier, calculating an Q update value through an accumulation operation, and providing the Q update value to the Q column multiplier to calculate a next Q matrix vector; wherein the norm multiplier updates a norm to be used in a next cycle based on an output of the Q update multiplier.

2. The QR decomposition apparatus of claim 1, further comprising:
    a second storage for receiving an output of the norm multiplier and outputting a $\sqrt{\text{norm}}$ value based on a lookup table; and
    a third storage for receiving an output of the norm multiplier and outputting a $1/\sqrt{\text{norm}}$ value based on a lookup table.

3. The QR decomposition apparatus of claim 2, wherein the R row multiplier calculates an R matrix vector by multiplying the Q matrix vector stored in the first storage by the reception signal vector.

4. The QR decomposition apparatus of claim 2, wherein the Q column multiplier calculates the Q matrix vector by multiplying the Q update value obtained in the Q update multiplier by an output of the third storage.

5. The QR decomposition apparatus of claim 2, wherein the Q update multiplier updates a Q value by subtracting a value obtained by accumulating values acquired by multiplying a previous Q update value by the R matrix vector calculated in the R row multiplier from the reception signal vector.

6. The QR decomposition apparatus of claim 2, wherein a floating point-type address is used to reduce the sizes of the second and third storages.

7. The QR decomposition apparatus of claim 6, further comprising:
    a floating point converter for converting the output of the norm multiplier into a floating point, inputting the floating point to the second and third storages by using efficient values as addresses, and outputting exponents; and
    a shifter for bit-shifting by receiving the exponents.

8. A QR decomposition method in a Multiple Input Multiple Output (MIMO) system, comprising:
    calculating an upper triangular matrix (R) vector by multiplying a Q matrix vector by a reception signal vector;
    updating the Q matrix vector through an accumulation operation based on the reception signal vector and the R row vector obtained in said calculating an upper triangular R matrix vector;
    updating a norm based on the Q matrix vector updated in said updating the Q matrix vector; and
    calculating a Q matrix vector based on a value obtained by the norm updated in said updating a norm and the updated Q matrix vector.

9. The QR decomposition method of claim 8, further comprising:
    calculating an initial noun by using the reception signal vector before said calculating an upper triangular (R) matrix vector.

10. The QR decomposition method of claim 8, wherein the value obtained based on the updated norm in said calculating a Q matrix vector is a $\sqrt{\text{norm}}$ value for a norm.

11. The QR decomposition method of claim 10, wherein the $\sqrt{\text{norm}}$ value is calculated based on a lookup table.

12. The QR decomposition method of claim 8, further comprising:
    storing the Q matrix vector obtained in said calculating a Q matrix vector in a memory.

13. The QR decomposition method of claim 12, wherein the R matrix vector is calculated by multiplying the Q matrix vector stored in the memory by the reception signal vector.

14. The QR decomposition method of claim 8, wherein the Q value is updated by subtracting a value obtained by accumulating values acquired by multiplying a previous Q update value by the R matrix vector from the reception signal vector.

15. The QR decomposition method of claim 11, wherein the $\sqrt{\text{norm}}$ value is acquired from the lookup table by using a floating point-type address.

16. The QR decomposition method of claim 15, wherein a significant value converted into a floating point is inputted to the lookup table as an address, and an exponent is bit-shifted.

17. The QR decomposition method of claim 12, further comprising:
    calculating a value for detecting a signal field by multiplying the Q matrix vector stored in the memory by the reception signal vector.

18. The QR decomposition method of claim 12, further comprising:
    calculating a vector for a data signal by multiplying the Q matrix vector stored in the memory by the reception signal vector for the data signal.

* * * * *